June 28, 1932.　　　　F. O. PAUL　　　　1,864,549
PORTABLE POWER DRIVEN TOOL AND POWER CONVERTING ATTACHMENT THEREFOR
Filed May 23, 1929　　　3 Sheets-Sheet 1
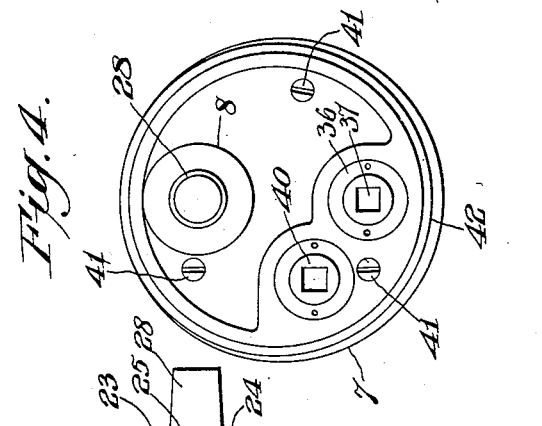
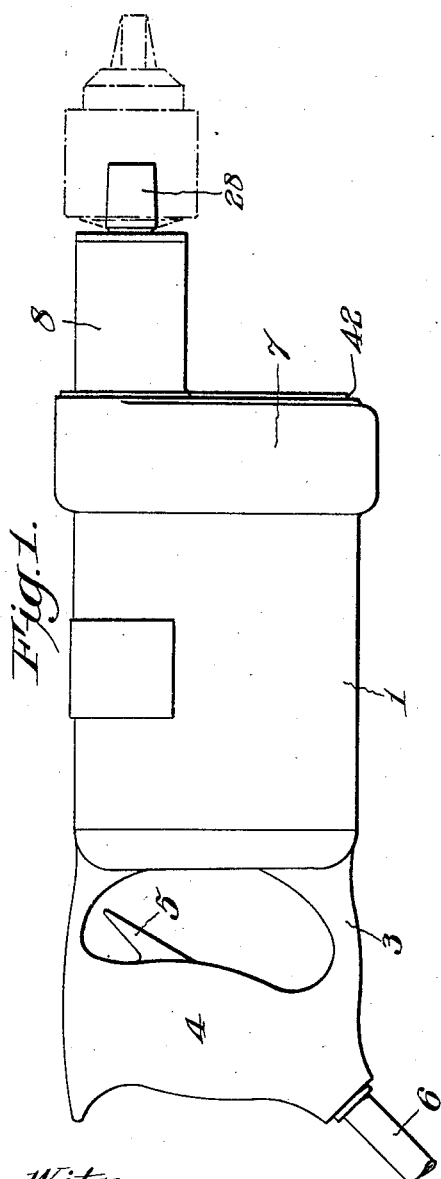
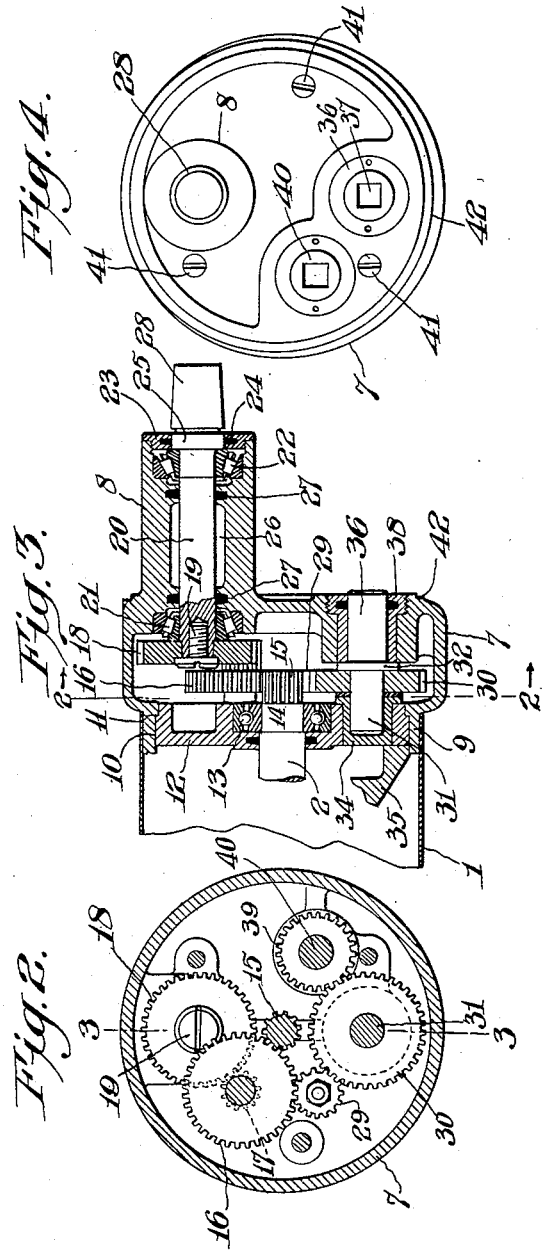
Inventor
Floyd O. Paul,
By Herbert S. Fairbanks
Attorney.

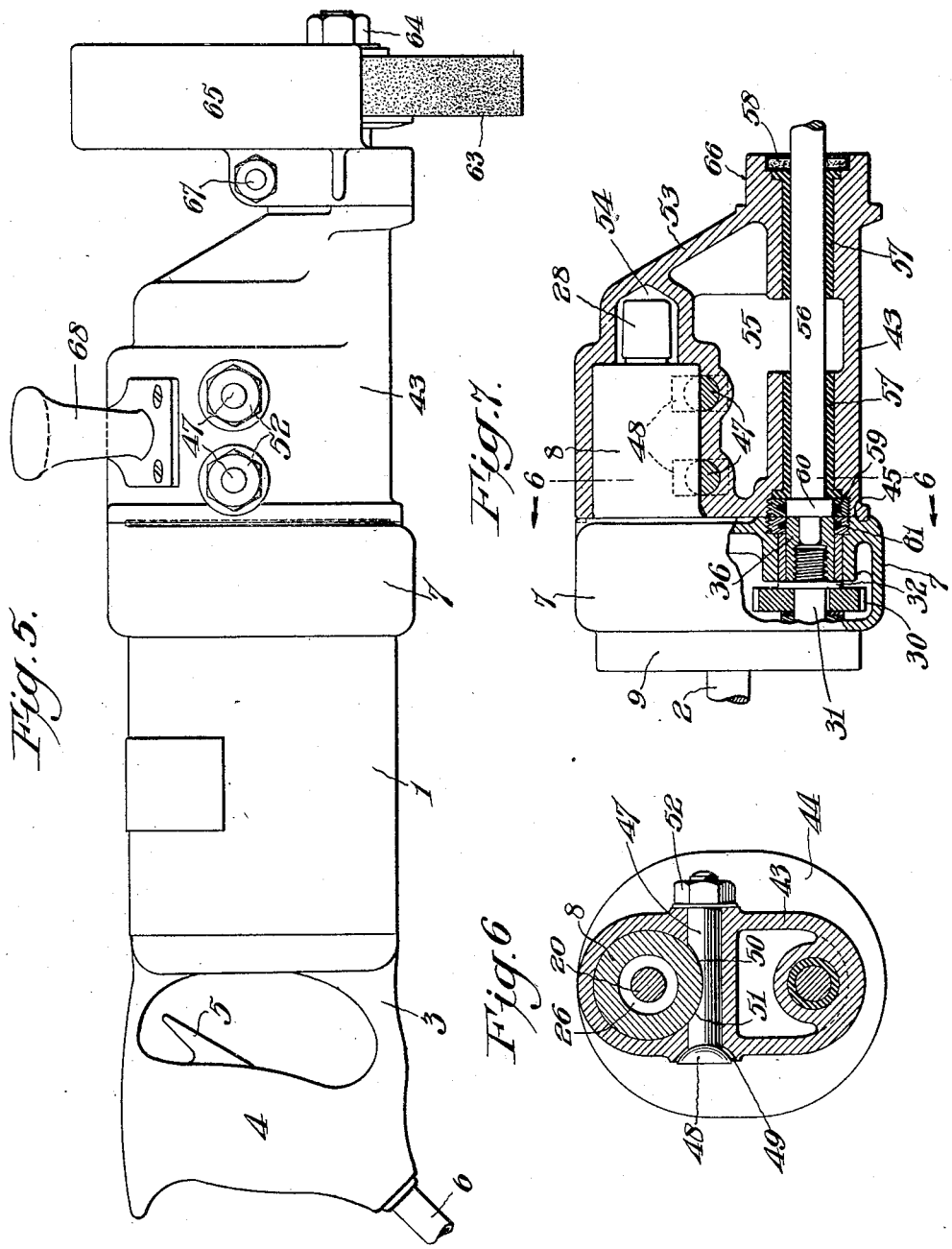

June 28, 1932.  F. O. PAUL  1,864,549
PORTABLE POWER DRIVEN TOOL AND POWER CONVERTING ATTACHMENT THEREFOR
Filed May 23, 1929   3 Sheets-Sheet 3
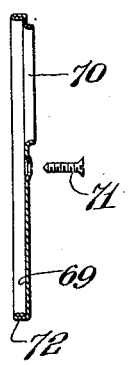
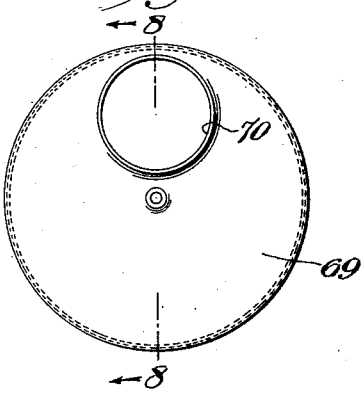
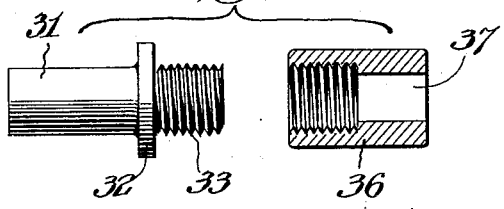
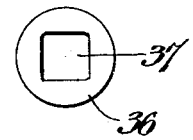
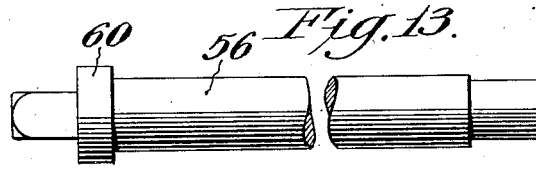
Inventor
Floyd O. Paul,
By Herbert S. Fairbanks
Attorney.

Patented June 28, 1932

1,864,549

UNITED STATES PATENT OFFICE

FLOYD O. PAUL, OF YEADON, PENNSYLVANIA

PORTABLE POWER DRIVEN TOOL AND POWER CONVERTING ATTACHMENT THEREFOR

Application filed May 23, 1929. Serial No. 365,394.

One of the objects of this invention is to devise a novel portable power driven tool of the rotary type wherein the rotary motion of the power shaft is transmitted to a desired number of take-off shafts constructed and arranged to operate at a desired number of revolutions per minute.

A further object of the invention is to devise a novel portable power driven tool wherein provision is made at the forward end of the tool for centering a power converting attachment adapted to be rigidly clamped to the nose of such tool to become a component part thereof and resemble in appearance a single purpose tool especially designed to suit a particular purpose.

A further object of the invention is to device a novel portable power driven tool wherein one or more power take-off shafts derive their power from the main driving pinion of the motor of the tool.

A further object of the invention is to construct a novel portable power driven tool and a power converting attachment in such a manner that the working tool will have the proper clearance due to the contour of the casing of the tool itself, and also of the casing of the power converting attachment, if employed.

With the above and other objects in view, as will hereinafter more clearly appear, my invention comprehends a novel portable power driven tool, which, for convenience of illustration, is shown in the form of an electric drill.

It further comprehends a novel portable power driven tool wherein a desired number of power take-off shafts are operatively connected with the main shaft of the motor to be driven thereby at any desired number of revolutions per minute within the range of the motor, so that, if desired, one power take-off shaft will have a different number of revolutions per minute from another power take-off shaft.

My invention further comprehends a novel portable power driven drill wherein the forward end of the tool is in the form of a gear housing provided with a forwardly projecting nose, the gear housing being provided with a machined surface adapted to receive and center a power converting attachment which is detachably connected with the nose of the portable tool.

It further comprehends a novel power converting attachment having a novel construction of a casing and novel means for clamping said casing to the nose of a power driven tool.

It further comprehends a novel power converting attachment wherein the rear end of its casing is machined to provide an accurate fit with the forward end of the power driven portable tool to which it is connected, and provided with a power shaft having novel means for connecting it with the power take-off shaft of the portable tool.

Other novel features of construction and advantage will hereinafter more clearly appear in the detailed description and the appended claims.

For the purpose of illustrating the invention, I have shown in the accompanying drawings a typical embodiment of it, which, in practice, will give reliable and satisfactory results. It is, however, to be understood that this embodiment is typical only and that the various instrumentalities of which my invention consists can be variously arranged and organized, and the invention is not limited to the precise arrangement and organization of these instrumentalities as herein set forth.

Figure 1 is a side elevation of a power driven portable tool embodying my invention.

Figure 2 is a section on line 2—2 of Figure 3.

Figure 3 is a sectional view of the forward portion of the tool, on line 3—3 of Figure 2.

Figure 4 is an end elevation of the forward end of the tool.

Figure 5 is a side elevation of the portable power driven tool, having a power converting attachment embodying my invention, rigidly clamped to the nose of the tool.

Figure 6 is a section on line 6—6 of Figure 7.

Figure 7 is a side elevation, partly in section, showing more clearly the manner in which the power converting attachment is driven from the portable tool.

Figure 8 is a section on line 8—8 of Figure 9, of a cover plate employed.

Figure 9 is an elevation of the cover plate.

Figure 10 is an exposed view partly in section of the auxiliary take-off shaft.

Figure 11 is an end elevation of the coupling seen in Figure 10.

Figure 12 is an end view of a counter-shaft.

Figure 13 is a side elevation of a counter-shaft.

Similar numerals of reference indicate corresponding parts.

Referring to the drawings:—

Referring first to the portable tool seen in Figures 1 to 5 inclusive, I have, for the purpose of illustration, shown the invention in the form of an electric driven drill, although, as will be apparent, in the broad and generic scope of this invention, any desired type of prime mover may be employed.

1 designates the housing or casing within which is contained a conventional electric motor, and, as any desired or conventional type of motor construction may be employed, I have deemed it unnecessary to illustrate and describe the electric motor and have deemed it necessary to simply show the driven armature shaft 2, see Figure 3.

The casing 1 has secured to it a handle 3 having a grasping portion 4 and a manually actuated controlling member 5, for example, the conventional lever for controlling the switch. The current is conducted to the tool through the electric conductor 6. The forward end of the tool is provided with a head or gear housing 7 having a forwardly projecting nose 8. The gear housing 7 is provided at its rear end with an annular extension 9 which is received in the forward end of the tool housing 1. The inner periphery of this extension 9 is recessed, as at 10, to form a shoulder 11, in order to adapt it to receive a bearing member 12 into which extends the forward end of the armature shaft 2, which is the main driving shaft of the portable power driven tool.

The bearing member 12 is recessed to receive an anti-friction bearing 13 and the power shaft is provided with a reduced neck 14 to receive this anti-friction bearing. The forward end of the armature shaft 2 is provided with a driving pinion 15 which meshes with a tool shaft reduction gear 16 to which is fixed a reduction pinion 17 which meshes with the tool shaft drive gear 18, which latter is secured by means of a fastening device 19, shown in the form of a screw, to the main power shaft or power take-off 20, which is mounted in the thrust bearings 21 and 22.

The gear housing 7 is recessed to receive the thrust bearing 21 and the forward end of the nose 8 is recessed to receive the thrust bearing 22 which latter is retained in position by means of a packing nut 23 in threaded engagement with the forward end of the nose and provided with a packing washer 24 which bears against a collar 25 on the power shaft 20. The nose is recessed as at 26 to form a lubricant receiving chamber, and packing washers 27 are provided at opposite ends of said chamber to prevent the leakage of lubricant. The forward end of the power shaft 20 is tapered as at 28 in order to adapt it to receive a chuck or any desired type of working tool.

Referring now more particularly to Figures 2, 3, and 4, it will be seen that the reduction gear 16 meshes with an idler 29, which, in turn, meshes with a power take-off gear 30. This gear 30 has fixed to it a shaft 31, having a shoulder 32, and having its forward end threaded as at 33. The shaft 31 has a bearing in a flanged bearing cap 34 which abuts against a motor frame 35. The forward threaded end 33 of the take-off shaft 31 is adapted to receive a pinion or coupling sleeve 36 which is internally threaded to receive the threaded portion 33 which, at its opposite end, is provided with a polygonally shaped aperture 37 adapted to receive a working tool or a power shaft. A packing nut 38 is in threaded engagement with the gear housing and has a sleeve projecting rearwardly and abutting against the annular shoulder 32. Any desired number of take-off shafts may be provided, and, for the purpose of illustrating a plurality of take-off shafts, I have shown the gear 30 as meshing with a gear 39 which is provided with a power take-off shaft 40, provided in a similar manner as the power take-off shaft 31 with means to receive a working tool.

The gear housing 7 is secured to the motor frame 35 by means of fastening devices 41, see Figure 4. The forward end of the gear housing is provided with an annular groove 42 which forms an annular flat machined face for centering a power converting attachment which will now be described.

Referring now more particularly to Figures 6 to 9 inclusive, I have shown in these figures a novel power converting attachment which may be utilized to drive any desired working tool. 43 designates the casing of a power converting attachment embodying my invention, which, at its rear end, is provided with the disc or plate 44 having an annular groove 45 to form an annular flat machined face adapted to closely engage the annular flat machined face of the gear housing 7, so that the power converting attachment will be accurately centered on the power driven portable tool. The shape of the body portion of the casing 43 will be clear from Figures 6, 8 and 9. The casing 43 is chambered as at 46 to receive the nose 8 of the power driven portable tool.

47 designates clamping bolts which are provided with rectangular shaped heads 48 which extend into the milled recess 49 to prevent the turning of the clamping bolts during adjustment. The clamping bolts are cut away as at 50 to provide a curved bearing shoulder 51 which will tightly clamp against the nose 8 when the nuts 52 are tightened. The forward end of the casing is preferably closed as at 53 and is recessed as at 54 to receive the end 28 of the main power shaft 20 or the portable tool.

The casing 43 is also chambered as at 55 to form a lubricant containing chamber and it is provided with a counter-shaft 56 journalled in the bushings 57. The forward bushing is provided with a packing washer 58 and the rear washer is provided with a packing gland 59 and is in threaded engagement with the recessed portion of the casing 43 and bears against a shoulder 60 on the counter-shaft 56. The inner end of the counter-shaft 56 has a polygonal contour as at 61 in order to be received in a polygonally shaped opening 37 in a coupling member such as, for example 36. The forward end of the counter-shaft 56 is threaded as at 62 or otherwise adapted to receive a working tool.

It will be understood that in accordance with this invention any desired type of working tool may be employed, and, for the purpose of illustrating one class of work which can be accomplished, I have shown the counter-shaft 56 as carrying a grinding wheel 63 secured thereto by means of a nut 64. The grinding wheel 63 is shown as provided with a guard 65 which is clamped to the annular shoulder 66 of the casing 43 by means of a clamping bolt 67.

The casing 43 is provided with a handle 68 of any desired character, secured to the casing in any desired or conventional manner. This handle facilitates the handling of the tool but in some cases may be dispensed with.

69, see Figures 8 and 9, is a cover plate to cover the auxiliary power take-off and is provided with an opening 70 through which the main power take-off extends. The plate 69 is detachably connected with the gear housing by means of a screw 71 and is provided with an annular flange to seat on the machined face of the gear housing.

In portable power driven tools as heretofore constructed, they have been made a single purpose tool, such as, for example, a power driven portable drill, and if the user desired to do some other class of work it has been necessary for him to purchase an additional single purpose tool designed for the character of work to be accomplished.

In accordance with my present invention, a user may purchase a single power driven portable tool and connect with it the proper type of power converting attachments which will accomplish the character of work which is desired without necessitating the expense of an additional power driven tool limited to only a certain class or classes of work.

It will therefore be apparent that in the broad and generic scope of the invention any desired type of power transmitting mechanism may be mounted in the casing 43 in order to be driven at the desired speed or apply the power at any desired location.

In Figures 2 and 3, I have shown a plurality of power take-offs, which, due to the size of gears employed, will provide different speeds, for example, as illustrated, with a power driven portable drill a speed of 2200 revolutions per minute can be obtained from the power take-off shaft 31 and 3200 revolutions per minute can be obtained from the power take-off shaft 40, it being understood that these relative speeds are for the purpose of illustration only and that by the use of the proper gearing any desired relative speeds may be obtained.

It will further be apparent that if the idler 29 is dispensed with and the gear 30 meshes with the gear 16 that the power take-off shafts will revolve in a reverse direction to that shown in the drawings so that the direction of rotation may be clockwise or counterclockwise.

Due to the provision of the annular grooves on the gear housing 7 and the casing 43, one of such parts is slightly recessed into the other to provide additional protection for accurately centering the power converting attachment on the power driven portable tool so that when clamped thereto it will form a component part of such tool and will give the appearance of an especially constructed power driven portable tool.

In providing for one or more power take-offs, it will be apparent that I utilize the power gear reduction of the tool itself so that a simplified and compact tool is provided without upsetting the balance of the tool or providing a bulky construction and excessive weight at the forward end of the tool, the advantages of which are self-evident to those skilled in the art.

In so far as I am aware, I am the first in the art to devise a power driven portable tool as herein disclosed having one or more power take-offs providing for different speeds of the power take-off shaft, and I am also the first, in so far as I am aware, to device a power converting attachment attachable and detachable to the forward end of the tool by clamping it around the nose of the tool and accurately centering it on the forward end of the tool. It is therefore to be understood that I desire my claims to such features to receive the broad and generic interpretation to which a pioneer in the art is entitled.

It will be apparent from the foregoing disclosure of my invention that I have devised a novel power driven tool preferably of a portable nature so that it can be grasped by the hand or hands of the user and which is constructed in such a manner that a power converting attachment can be connected therewith. This power converting attachment is intended to be connected with a power take-off of the power driven tool to give any desired type of motion to a working tool.

As it is manifestly impracticable to illustrate all the different embodiments of attachment which can be employed in this application I have illustrated only one form in which a rotary motion is imparted to the working tool. It is, however, within the broad and generic scope of my invention to have the attachment constructed in such a manner that it can be employed for a wide variety of purposes, for example, abrading, grinding, polishing, cutting, sanding and finishing any desired material or product, waxing, such as floor waxing, valve grinding, tapping, drilling, reaming, shearing, and nibbling. The power converting attachment may therefore be employed to drive and control any desired mechanism.

It will now be apparent that I have devised a new and useful portable power driven tool and power converting attachment therefor which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:—

1. A portable power driven tool having a nose at its forward end, with a main power take-off, an auxiliary power take-off, and a power converting attachment fixed to said nose and deriving power from said auxiliary power take-off.

2. The combination with a portable power driven tool, having a projecting nose, and a machined face, of a power converting attachment clamped to said nose and seated on said machined face.

3. A portable power driven tool having a nose, and a power converting attachment clamped to said nose, juxtaposed faces of said tool and attachment being machined to fit one within the other to align the attachment on the tool.

4. The combination with a portable power driven tool having a nose and a main and an auxiliary power take-off, of a power converting attachment clamped to the nose of said tool, concealing said main power take-off and deriving its drive from said auxiliary power take-off.

5. A portable power driven tool having a nose and a machined seat to receive and center a power converting attachment, a main power take-off, and an auxiliary power take-off to drive said power converting attachment.

6. A portable power driven tool, having a gear housing at one end, and a projecting nose, a main power shaft extending through said nose, a motor driven pinion in said housing intergeared with said main power shaft, an auxiliary power shaft in said housing and intergeared with said pinion, and a driving connection for said auxiliary power shaft accessible from the exterior of said housing for making a driving connection.

7. The combination with a power driven tool, having a nose, a main power take-off and an auxiliary take-off, of a housing adapted to conceal the main power take-off, means to clamp said housing around said nose, and a power take-off in said housing adapted to be connected with the auxiliary power take-off of the portable tool.

8. The combination with a power driven tool, having a main and an auxiliary power take-off at one end, and having a nose, of a power converting attachment recessed to receive said nose, clamping bolts to secure said attachment to said nose, and a power driven member in said housing adapted to be connected with said auxiliary power take-off.

9. The combination with a power driven tool, having at one end a main power take-off, an auxiliary power take-off and a nose through which said main power take-off extends, of a power converting attachment having a housing to receive said nose, centering means common to said tool and housing, clamping means to secure said housing to said nose in aligned position with respect to said tool, and a shaft journalled in said housing and adapted to be connected with said auxiliary power take-off.

10. A power converting attachment for power driven tools, comprising a housing having centering means at one end, and provided with a counter-shaft adapted at one end to form a connection with a driven member of the portable tool, and having its opposite end terminating within the housing and adapted to receive a working tool.

11. A power converting attachment for power driven tools, comprising a housing having means to conceal the normal power take-off of the tool, and having a driving member adapted to be connected with a driven member of the tool, and clamping means for securing said housing to the power driven tool.

12. A power driven tool, having a main power take-off and an independently operable auxiliary power take-off, and provided with a machined face for centering a power converting attachment.

13. A portable power driven tool, having a main and an auxiliary power take-off and provided with a grasping handle, a power converting attachment driven by said auxiliary power take-off and clamped to the forward end of said tool, and a grasping handle for said power converting attachment.

14. A portable power driven tool, having a main and an auxiliary power take-off, and a cover detachably connected with said tool to cover said auxiliary take-off.

15. A portable power driven tool, having a main and an auxiliary power take-off, and a cover detachably connected with said tool to cover said auxiliary take-off, and provided with an opening through which said main take-off extends.

FLOYD O. PAUL.